United States Patent [19]

Kikawa et al.

[11] Patent Number: 5,293,260
[45] Date of Patent: Mar. 8, 1994

[54] OPTICAL REPEATER OFF-STATE SUPERVISORY METHOD AND DEVICE THEREFOR

[75] Inventors: Katsumi Kikawa, Ichikawa; Mitsuo Kitamura, Kawasaki, both of Japan

[73] Assignee: Fujitsu Limited, Kawasaki, Japan

[21] Appl. No.: 729,306

[22] Filed: Jul. 12, 1991

[30] Foreign Application Priority Data

Jul. 13, 1990 [JP] Japan ................. 2-186179

[51] Int. Cl.$^5$ .............. H04B 10/08; H04B 10/02
[52] U.S. Cl. ..................... 359/177; 359/174; 359/175; 359/110
[58] Field of Search ............. 359/174, 175, 176, 177, 359/110; 178/69, 70; 375/3.1, 3; 371/20.1, 20.4, 20.6, 20.2; 455/9, 14, 115; 340/825.02, 825.16

[56] References Cited

U.S. PATENT DOCUMENTS

| | | |
|---|---|---|
| 4,211,920 | 7/1980 | Wakabayashi ............. 359/110 |
| 4,257,303 | 3/1981 | Ota et al. ..................... 359/110 |
| 4,266,183 | 4/1981 | Steensma et al. ............ 359/110 |
| 4,313,224 | 1/1982 | Wakabayashi et al. ...... 359/110 |
| 4,586,186 | 5/1986 | Anderson ..................... 359/110 |
| 4,823,344 | 5/1989 | Yonehara ..................... 371/20.1 |
| 4,825,113 | 5/1989 | Sato et al. .................... 359/110 |
| 5,105,426 | 4/1992 | Hagiwara ..................... 371/20.1 |

*Primary Examiner*—Richard E. Chilcot, Jr.
*Assistant Examiner*—Rafael Barares
*Attorney, Agent, or Firm*—Armstrong, Westerman, Hattori, McLeland & Naughton

[57] ABSTRACT

An optical repeater OFF-state supervisory method includes the steps of: converting an input optical signal into an electrical signal; monitoring a level of the input optical signal from a monitored value when converted into the electrical signal; monitoring whether an input optical signal to an optical repeater is in an OFF state or not; detecting that the input optical signal has been in an OFF state; and changing the monitored value to a predetermined fixed monitored value.

3 Claims, 8 Drawing Sheets

OPTICAL REPEATER OFF-STATE SUPERVISORY METHOD AND DEVICE THEREFOR

BACKGROUND OF THE INVENTION

1. Field of the Invention

The present invention relates to an OFF-state supervisory method and device of an optical repeater in which an input optical signal is converted into an electrical signal and at a state of electrical signal, after signal regeneration processing is carried out, the electrical signal is again restored to an optical signal to be output, and particularly, to an OFF-state supervisory method and device of an optical repeater which, based on a monitored value when converted into an electrical signal, a level of input optical signals can be monitored.

2. Description of the Related Art

In general, an optical signal is attenuated or degraded in an optical transmission line. An optical repeater is utilized to restore the above attenuated/degraded original signal to a pseudo-original waveform to transmit it back to the optical transmission line.

When an optical input is in an OFF state, originating from a noise output of an avalanche photodiode, a monitored value M1 is larger than the minimum value $M_{min}$ of monitored values when the input optical signal is not in an OFF state.

Once such ambiguous phenomenon occurs, it will not be able to discriminate whether the relevant monitored value M1 is the monitored value when an optical input is not in an OFF state or the one when the optical input is in an OFF state. Therefore, for example, when a line fault occurs, it is not discernible whether the line fault originated from an optical fiber device or from an optical repeater.

SUMMARY OF THE INVENTION

An object of the present invention is to provide an optical repeater OFF-state supervisory method wherein, when an OFF-state of an input optical signal is detected, a monitored value is changed to a predetermined fixed monitored value, and when a line fault is located, a partition between the optical repeater and an optical fiber device can be carried out without fail.

In accordance with a feature of the present invention, there is provided an optical repeater OFF-state supervisory method including the steps of; converting an input optical signal into an electrical signal; monitoring a level of the input optical signal from a monitored value when converted into the electrical signal; monitoring whether an input optical signal to an optical repeater is in an OFF state or not; detecting the input optical signal in an OFF state; and changing the monitored value to a predetermined fixed monitored value.

In accordance with another feature of the present invention, there is provided an optical repeater OFF-state supervisory device comprising:

a photoelectric conversion means for converting an input optical signal into an electrical signal;

an equalizing amplifier means for waveform-shaping said electrical signal output from said photoelectric conversion means;

a monitoring circuit means, associated with said equalizing amplifier means, for detecting a monitored value when converted into an electrical signal;

a clock extraction means for extracting a timing clock for regenerating signals from an output of said equalizing amplifier means;

a discrimination circuit means for regenerating the output of said equalizing amplifier means into a desired pulse waveform by means of a timing clock from said clock extraction means;

an electro-photoconversion means for converting an electrical pulse signal into an optical pulse signal;

a monitoring circuit means further includes:

a monitored value output processing unit for receiving a monitored value from said monitoring circuit means and carrying out phase modulation after an A/D conversion of said monitored value; and an input-OFF-state detection means for detecting an input OFF-state from a signal of said discrimination circuit means to send the output to a change-over circuit; and a change-over circuit means for receiving a signal of the result of detection from the input OFF-state detection means; wherein, while it is not detected that an input optical signal has been in an OFF state, said change-over circuit means is in a HIGH level state and when it is detected at said input OFF-state detection means that the input optical signal has been in an OFF state, the change-over circuit means is switched over to a LOW level state.

DESCRIPTION OF THE PREFERRED EMBODIMENT

Before describing an embodiment of the present invention, a prior art optical repeater OFF-state supervisory method will be described with reference FIGS. 1 to 4.

Figure 1:
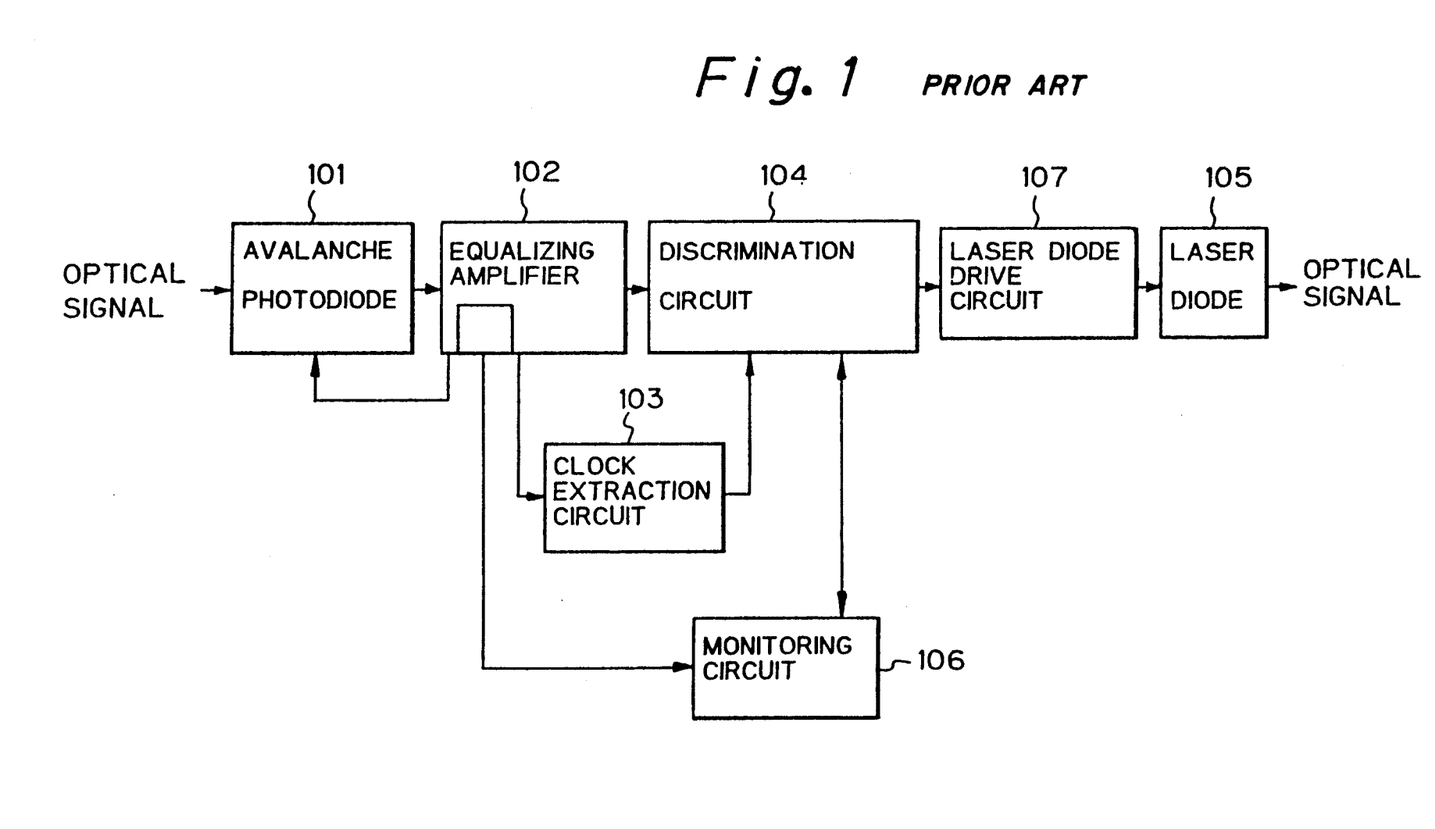
FIG. 1 is a block diagram showing a prior art optical repeater which has a function for monitoring a level of an optical signal.

FIG. 1 is a block diagram showing a prior art optical repeater, which is provided with a level monitoring function for Monitoring an optical signal. Reference numeral 101 denotes an avalanche photodiode (APD) which converts input optical signals into electrical signals with a desired range of voltages and is regarded as a photoelectric converter having a full range automatic gain control (AGC) function.

102 denotes an equalizing amplifier which carries out an automatic gain control of an electrical signal output from the avalanche photodiode 101 and a monitoring circuit 102-1 is provided which detects a monitored value when converted into an electrical signal.

Figure 2:
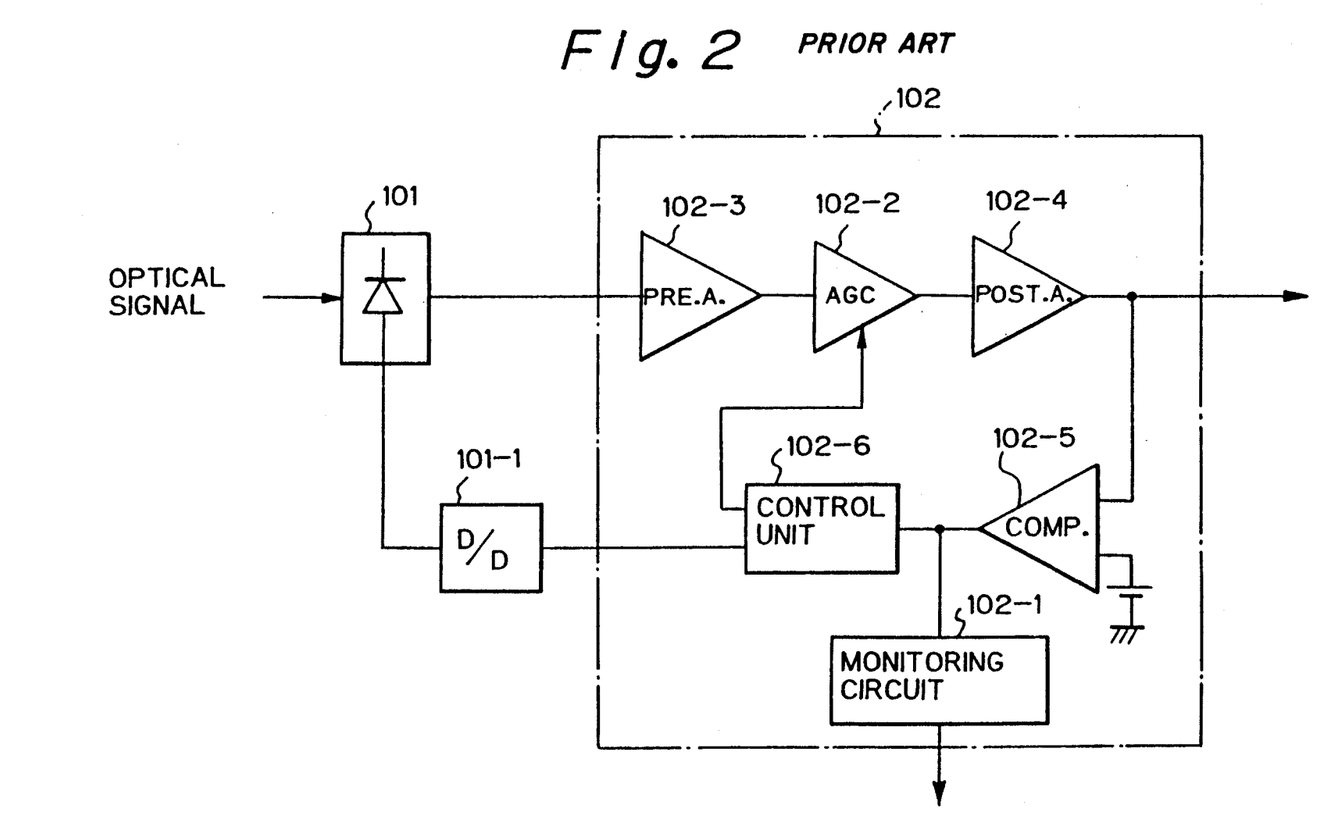
FIG. 2 is a block diagram showing a connection of an equalizer with an avalanche photodiode.

FIG. 2 illustrates a detailed block diagram showing the connection relationship between an APD and an equalizing amplifier. The equalizing amplifier 102 is provided with a preamplifier 102-2, an AGC circuit 102-3, a post-amplifier 102-4, a comparator 102-5 and a control unit 102-6, other than a monitoring circuit 102-1.

In the equalizing amplifier 102, an output of the post amplifier 102-4 is fed back to the AGC circuit 102-3 via a comparator 102-5 and a control unit 102-6, so a desired signal voltage, by which a gain is controlled, is devised for output. One of the outputs of the control unit 102-6 is sent to the avalanche photodiode 101 via a DC/DC converter 101-1 to supply a control signal for automatically controlling a gain of the optical signal thereto.

Figure 3:
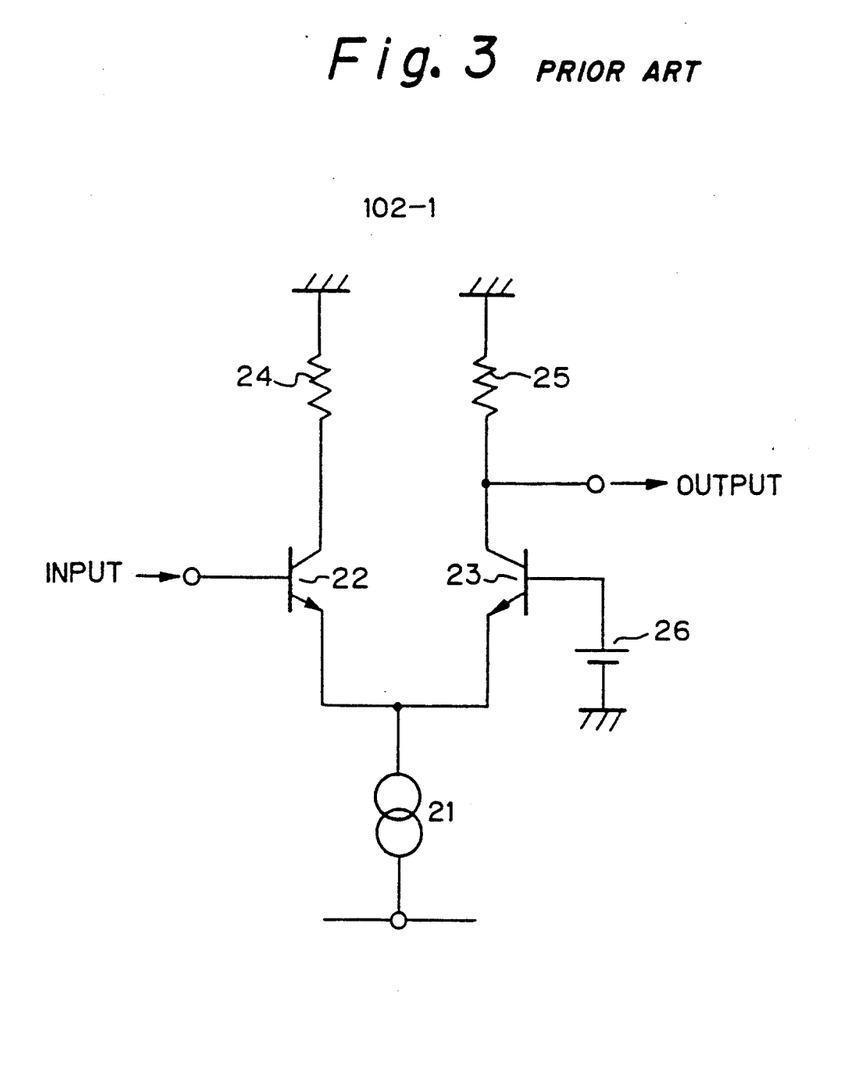
FIG. 3 is a circuit diagram of a monitoring circuit.

FIG. 3 is a circuit diagram of a monitoring circuit shown in FIG. 2. The monitoring circuit 102-1 includes a current source 21, a pair of transistors 22, 23, a pair of resistors 24, 25 and a bias voltage source 26. An input of the monitoring circuit 102-1 is applied to a base of transistor 22 and, via a differential pair formed by a pair of transistors and resistors, an output is fetched by a collector of transistor 23.

In FIG. 1, 103 denotes a clock extraction circuit, in which a signal reproduction timing clock is extracted from one of the outputs of the equalizing amplifier 102.

104 denotes a discrimination circuit which refreshes the output from the equalizing amplifier 102 into a desired pulse waveform by means of a timing clock from the clock extraction circuit.

107 is a laser diode drive circuit which processes a signal refreshed by the discrimination circuit 104 to drive a laser diode. The laser diode drive circuit 107 is regarded as a regenerator.

105 denotes a laser diode which is utilized to convert an electrical pulse signal from the laser diode drive circuit 107 into an optical pulse signal.

106 denotes a monitoring circuit which monitors a level of an optical input signal, based on the monitored value from a monitoring circuit 102-1 and the result of the monitoring is output through a discrimination circuit 104, for example, after an execution of phase modulation.

According to an optical repeater in the prior art, an input optical signal is converted into an electrical signal by an avalanche photodiode 101 and after waveform shaping by an equalizing amplifier 102, the electrical signal is regenerated by a discrimination circuit 104 and then through a laser diode drive circuit 107, converted again into an optical signal by an laser diode 105 to be output thereby.

At this time, in the monitoring circuit 102-1 of the equalizing amplifier 102, a monitored value (electrical signal) responding to the input optical signal is output to the monitoring circuit 106, whereby the monitored value is analog-to-digital-converted and then output through the discrimination circuit 104 therefrom after the execution of phase modulation.

Figure 4:
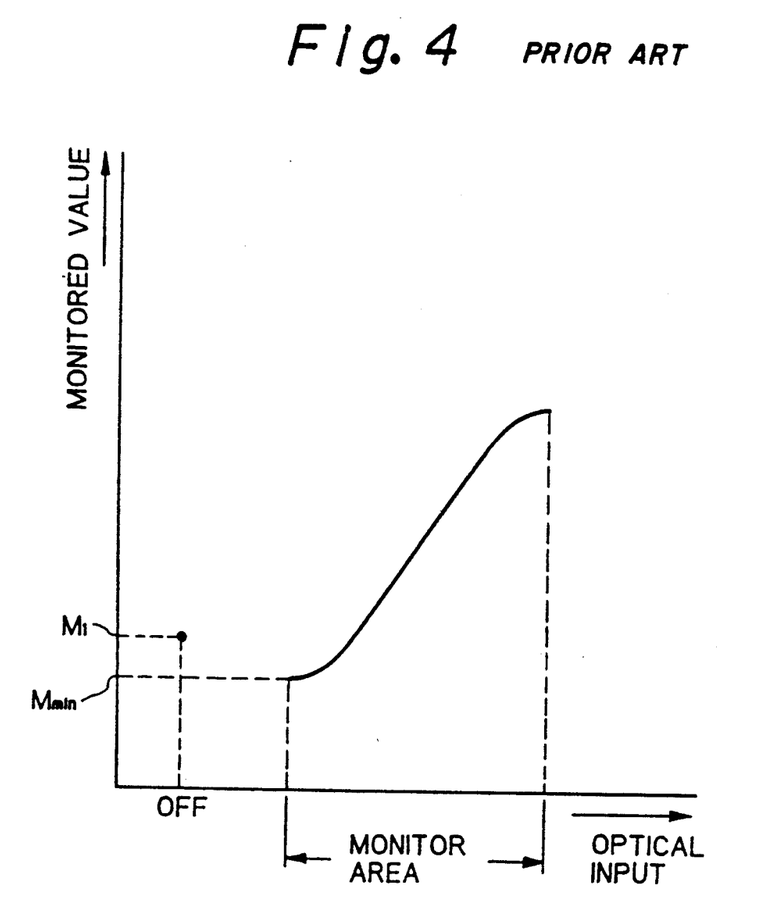
FIG. 4 is a prior art diagram showing a characteristic curve of a monitored value vs. an optical input.

FIG. 4 is a diagram showing monitored value vs optical input characteristic curve in the prior art. As seen from FIG. 4, when an optical input is in an OFF state, a monitored value M1 is produced which is larger than the minimum value $M_{min}$ of the monitored value when the input optical signal is not in an OFF state.

An occurrence of such phenomenon is presumed to be caused by an output noise of the avalanche photodiode. Once such phenomenon occurs, when the monitored value is equal to M1, it is not possible to discriminate whether it is a monitored value when the optical input is not in an OFF state, or it is a monitored value when the optical input is in an OFF state. Therefore, for example, when a line fault occurs, it is not distinguishable whether it originates from a fault by an optical fiber or a fault by an optical repeater.

The present invention is intended to provide an optical repeater OFF-state supervisory device such that, when it is detected that an input optical signal has been in an OFF-state whereby the input Off-state of the input optical signal signifies an interruption of a transmission line connected to the optical repeater, a monitored value is then changed to a predetermined fixed monitored value; and when a line fault is located, a partition of the optical repeater and the optical fiber can be sufficiently carried out.

Figure 5:
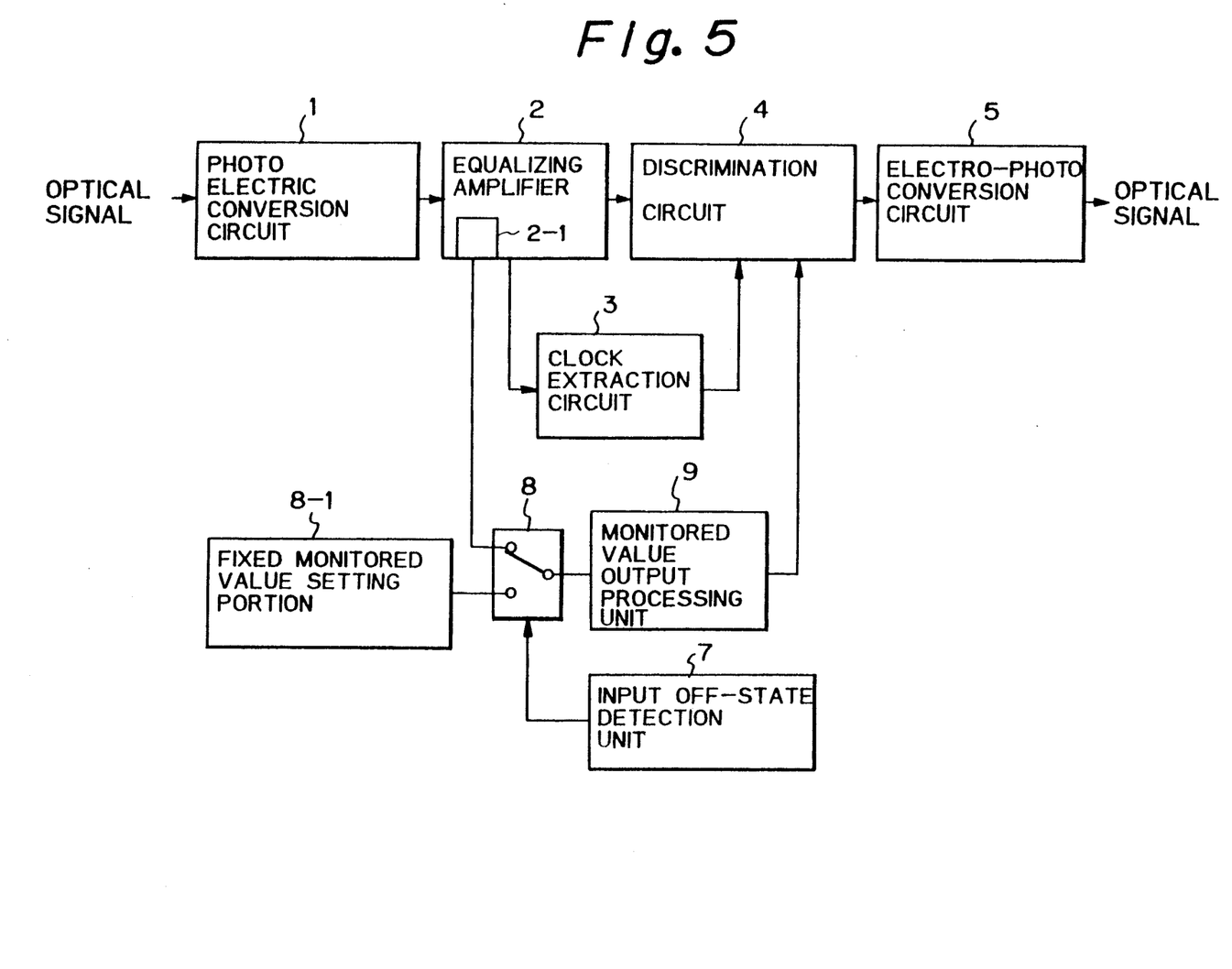
FIG. 5 is a block diagram showing an essential function of an embodiment in accordance with the present invention.

FIG. 5 is a block diagram showing an essential function of an embodiment in accordance with the present invention.

In FIG. 5, reference numeral 1 denotes a photoelectric conversion circuit which converts an input optical signal into an electrical signal. Reference numeral 2 denotes an equalizing amplifier which effects waveform-shaping on an electrical signal output from the photoelectrical conversion circuit 1 and a monitoring circuit 2-1 for detecting a monitored value when converted into an electrical signal is provided in the equalizing amplifier 2.

3 denotes a clock extraction circuit which extracts a timing clock for regenerating signals from an output of the equalizing amplifier 2. 4 denotes a discrimination circuit which regenerates the output of the equalizing amplifier 2 into a desired pulse waveform by means of a timing clock from the clock extraction circuit 3.

5 denotes an electro-photo conversion circuit which converts an electrical pulse signal from the discrimination circuit 4 into an optical pulse signal. 7 denotes an input OFF-state detection unit which detects an OFF-state of the optical input. 8 denotes a change-over switch which selects either a monitored value from the monitoring circuit 2-1 or a fixed monitored value from a fixed monitored value setting portion 8-1 and then outputs it. While it is not detected that an input optical signal has been in an OFF-state in the input OFF-state detection unit 7, the change-over switch 8 is changed over such that a monitored value from the monitored circuit 2-1 may be output and when it is detected that the input optical signal has been in an OFF-state, the switch 8 is changed over such that the fixed monitored value may be output.

In view of these facts, when an OFF-state of the input optical signal is detected, the monitored value is changed into the predetermined fixed monitored value.

As for the above fixed monitored value, it is preferable to set the fixed monitored value to a smaller value than the minimum value of the monitored value when an input optical signal is not in an OFF-state.

9 denotes a monitored value output processing unit in which a desired processing is carried out such that a monitored value from the change-over switch 8 may be output through the discrimination circuit 4.

In accordance with the optical OFF-state supervisory device of the present invention, an input optical signal is converted into an electrical signal by an photoelectrical conversion circuit 1 and after signal regeneration processing is carried out as an electrical signal at the equalizing amplifier 2 and the discrimination circuit 4, the electrical signal is restored again to an optical signal to be output in the electro-photo conversion circuit 5, where based on the monitored value when an original optical signal is converted into an electrical signal, the level of input optical signal is continuously monitored during that time, and at the same time, whether an input optical signal to the optical repeater has been in an OFF-state or not, is being monitored at the input OFF-state detection unit 7. If the input OFF-state detection unit 7 detects that an input optical signal has been in an OFF-state which signifies an interruption of a transmission line connected to the optical repeater, a change-over switch 8 is switched over from a monitoring circuit (2-1) side to a fixed monitored value setting portion (8-1) side and so that a monitored value is changed to a fixed monitored value.

Figure 6:
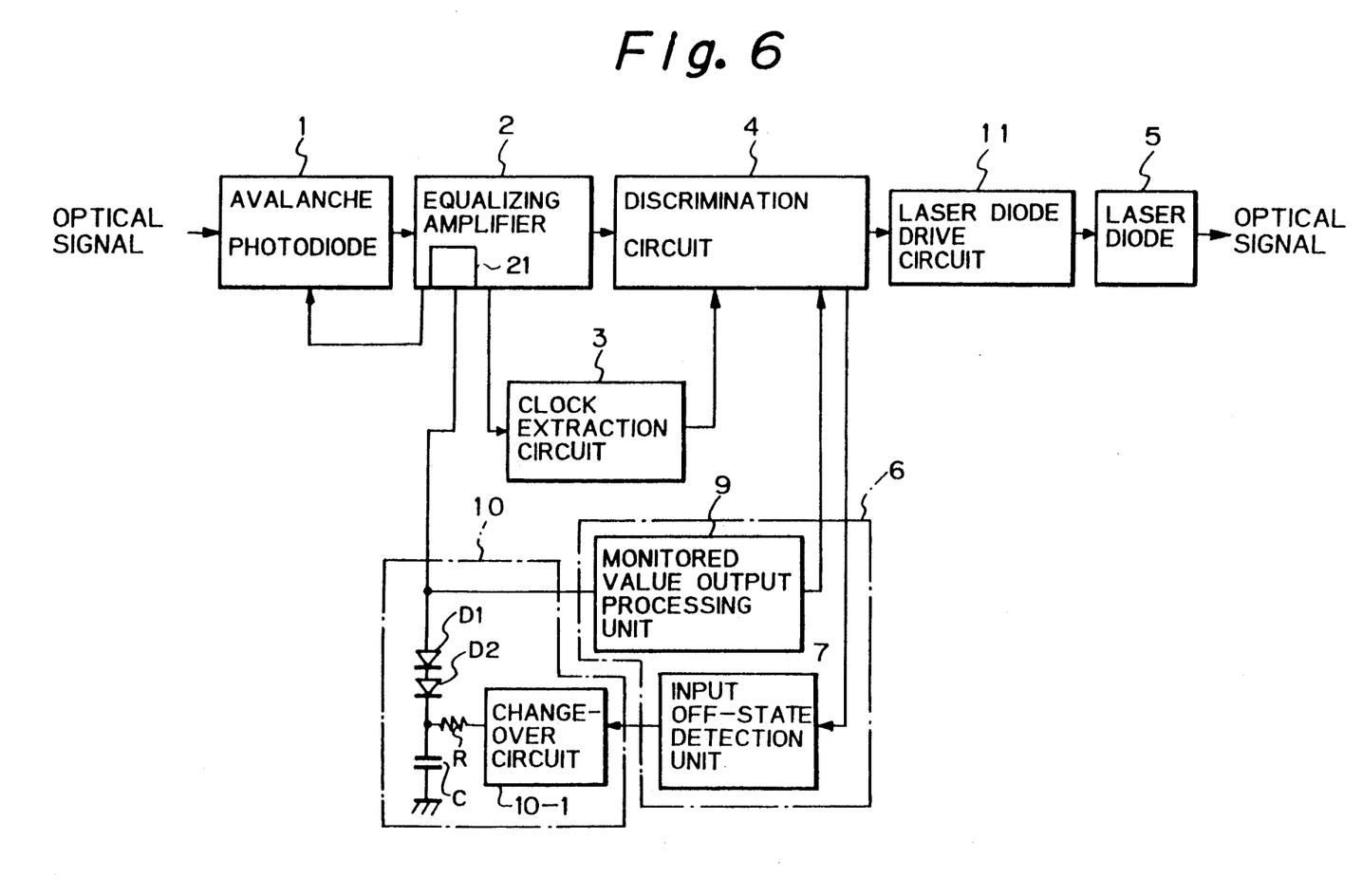
FIG. 6 is a block diagram showing an embodiment of the present invention.

FIG. 6 is a block diagram showing an embodiment of the present invention. The optical repeater having an optical signal level monitoring function, a shown in FIG. 6, includes an avalanche photodiode 1, an equalizing amplifier 2, a clock extraction circuit 3, a discrimination circuit 4, a laser diode drive circuit 11, a laser diode 5 in use for an electro-photo conversion circuit, a monitoring circuit 6 and a monitored value change-over circuit 10.

An avalanche photodiode 1 is a photoelectric transducer which converts an input optical signal into a desired voltage range of electrical signals and possesses a so-called full function of automatic gain control (AGC) or optical AGC.

An equalizing amplifier 2 effects a further automatic gain control for the electrical signal output from the avalanche photodiode 1 to execute a waveform reshaping and a monitoring circuit 2-1 for detecting a monitored value when converted into an electrical signal is provided to the equalizing amplifier 2. As in the prior art, the equalizing amplifier 2 includes an AGC (automatic gain control) circuit, a preamplifier, a postamplifier, a comparator and a control unit as well as the monitoring circuit 2-1 (Refer to FIG. 2). The monitoring circuit 2-1 also includes a current source and a differential pair amplifier with a pair of transistors and resistors, and an input signal is applied to either transistor and the output is fetched from the other transistor (Refer to FIG. 3).

A clock extraction circuit 3 extracts a timing clock for regenerating a signal from the output of the equalizing amplifier 2. A discriminating circuit 4 regenerates the output from the equalizing amplifier 2 into a desired pulse waveform by means of a timing clock from the clock extraction circuit 3.

A laser diode drive circuit 11 treats a signal regenerated by the discrimination circuit 4 in order to drive a laser diode 5. A laser diode 5 converts an electrical pulse signal from the laser diode drive circuit 11 into an optical pulse signal.

Figure 8:
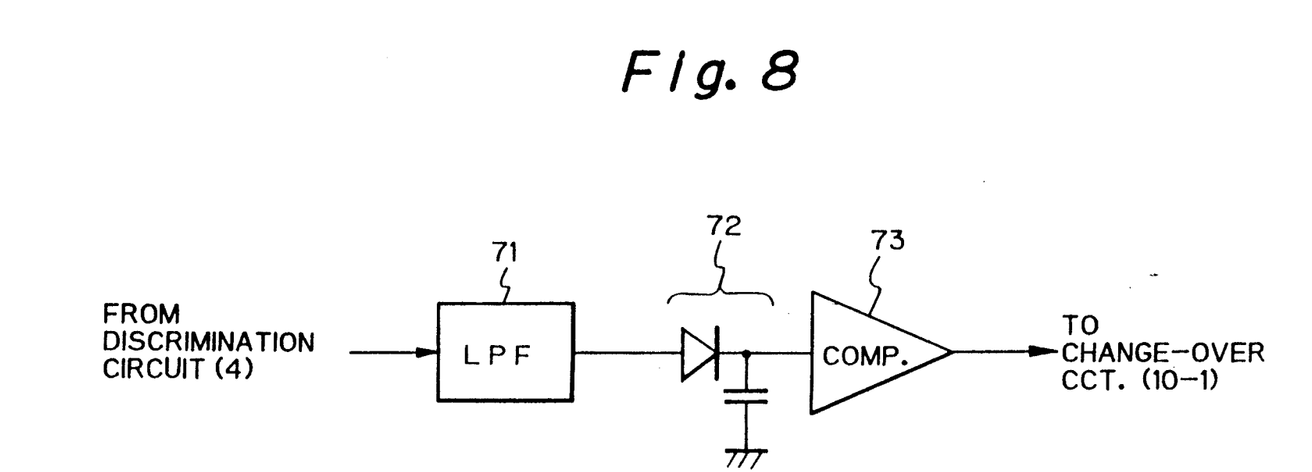
FIG. 8 is a block diagram showing an input OFF-state detection unit.

A monitoring circuit 6 monitors a level of an optical input signal, based on the monitored value output from the monitoring circuit 2-1 and the result of monitoring is, for example, after effecting phase modulation, output through the discrimination circuit 4. For this reason, the monitoring circuit 6 includes a monitored value output processing unit 9 which receives a monitored value from the monitoring circuit 2-1 and after an analog-to-digital conversion of the monitored value, phase modulation is carried out. Further, the monitoring circuit 6 includes an input OFF-state detection unit 7 which detects an input OFF-state from, for example, an error rate detection signal of the discrimination circuit 4. The input OFF-state detection circuit 7 comprises a low pass filter 71, a peak detection circuit 72 of a diode and a capacitor and a comparator 73. A signal from the discrimination circuit 4 is input to the input OFF-state detection circuit and a low frequency signal via a low pass filter 71 is peak-detected by a peak detection circuit 72 and then an input OFF-state is detected by a comparator 73 the output of which is sent Via a change-over circuit 10-1.

While the input OFF-state detection unit 7 does not detect that an input optical signal has been in an OFF state, a monitored value from the monitoring circuit 2-1 is output at the input OFF-state detection unit 7, and when the input OFF-state detection unit 7 detects that the input optical signal has been in an OFF state, a change-over is carried out such that a fixed monitored value may be output, where the fixed monitored value is determined to be a value M2, smaller than the minimum value $M_{min}$ of the monitored value when an input optical signal is not in an OFF state. For this reason, two diodes $D_1$ and $D_2$ and a capacitor C are connected in parallel with an output line of the monitoring circuit 2-1 and a connection point between a diode D2 and a capacitor C is connected to the change-over circuit 10-1 via a resistor R.

The change-over circuit 10-1 receives a signal of the result of detection from the input OFF-state detection unit 7 and while it is not detected that an input optical signal has been in an OFF state, the change-over circuit 10-1 is in a HIGH level state, and when it is detected at the input OFF-state detection unit 7 that the input optical signal has been in an OFF state, the change-over circuit 10-1 is switched over to a LOW level state.

Therefore, when the input optical signal is not in an OFF state, since the change-over circuit 10-1 is in a HIGH level state, the monitored value from the monitoring circuit 2-1 is input to the monitored value output processing unit 9 of the monitoring circuit 6. When the input OFF-state detection unit 7 detects that the input optical signal has been in an OFF state, since the change-over circuit 10-1 is switched over to a L level state, a fixed monitored value M2 is input to a monitored value output processing unit 9 of the monitoring circuit 6.

In this case, due to the circuit elements formed by a resistor R and a capacitor C in the monitored value change-over circuit 10, the operation of the circuit is kept stable even in a transient time of the above change-over operation. Further, due to an action of the above diodes D1 and D2, the monitored value from the monitoring circuit 2-1 does not suffer from an influence of the monitored value change-over circuit 10.

Based on the above constitution of the optical repeater, after the input optical signal has been converted into an electrical signal by an avalanche photodiode 1, and then waveform-shaped by an equalizing amplifier 2, it is regenerated by the discrimination circuit 4 and restored again to an optical signal by an laser diode 5 to be output.

The input OFF-state detection unit 7 of the monitoring circuit 6 always monitors whether or not an input optical signal to an optical repeater has been in an OFF state and when the input optical signal is not in an OFF state, since the change-over circuit 10-1 of the monitored value change-over circuit 10 is in a HIGH level state, a monitored value from the monitoring circuit 2-1 is input to a monitored value output processing unit 9 of the monitoring circuit 6. But if the input OFF-state detection unit 7 detects that an input optical signal has been in an OFF state, a change-over circuit 10-1 of the monitored value change-over circuit 10 is switched over to a LOW state, so a fixed monitored value M2 is input to a monitored value output processing unit 9 of the monitoring circuit 6.

Figure 7:
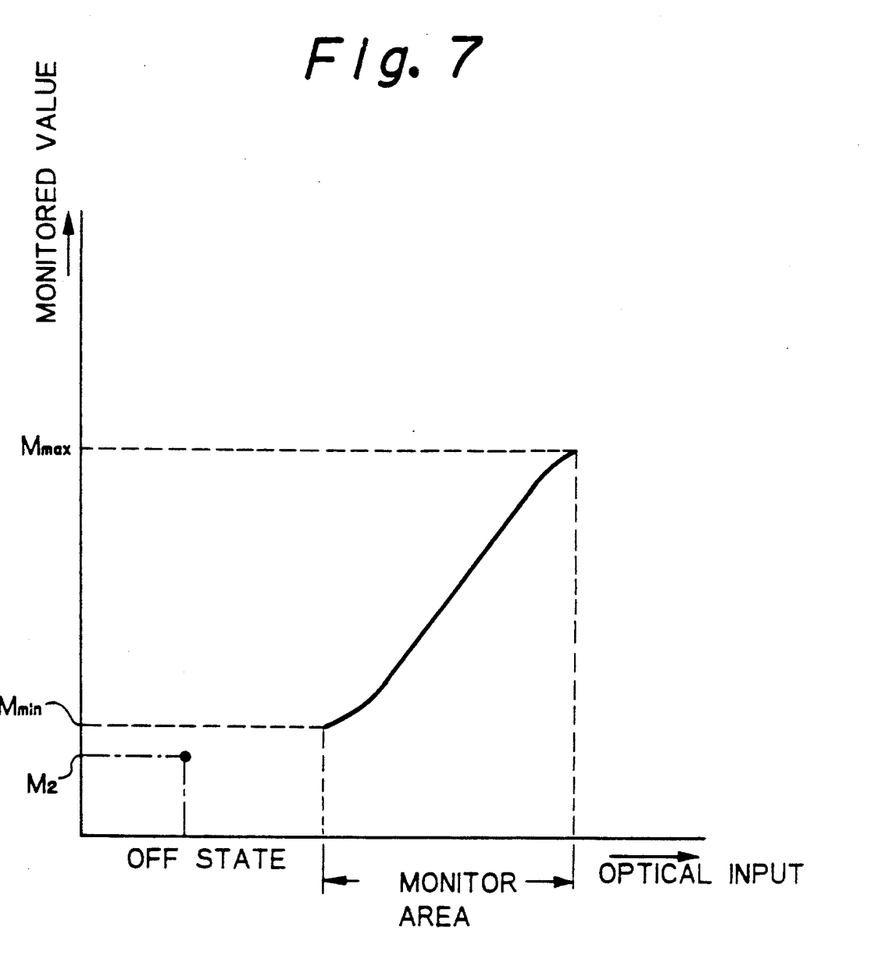
FIG. 7 is a diagram showing a monitored value vs. an optical input characteristic curve of an embodiment in accordance with the present invention.

If it is detected that an input optical signal has been in an OFF state, since the monitored value is changed to a predetermined fixed monitored value M2, when the monitored value is M2, it is possible to determine that it is a monitored value when an optical input is in an OFF state. From this, if a line fault occurs, it is possible to determine precisely and certainly whether it is a fault in an optical fiber device or a fault in an optical repeater and so as a result, it is possible to carry out a trustworthy partition between an optical repeater and an optical fiber device in the case of locating a fault in the monitoring lines.

In the above embodiment, the case when the monitored value is transmitted in a direction of optical output is described, but since an optical repeater is generally provided for upstream and downstream, when a detection of monitored values is carried out for upstream (or downstream), it can be restored to a direction of optical input by inserting it for downstream (or for upstream).

We claim:

1. An optical repeater OFF-state supervisory method comprising the steps of:
    converting an input optical signal into an electrical signal;
    monitoring a level of said input optical signal from a plurality of monitored values when said input optical signal is converted into said electrical signal; and
    monitoring whether an input optical signal to an optical repeater is in an OFF state or not, wherein said monitoring step includes the steps of: (a) detecting that said input optical signal has been in an OFF state for detecting a line fault, and (b) changing said monitored value to a predetermined fixed monitored value,
    wherein said fixed monitored value is set to a value smaller than the minimum value among said plurality of monitored values when said input optical signal is not in an OFF state so as to detect that a fault has occurred in an optical transmission line connected to said optical repeater when said input optical signal is in said OFF state and when said fixed monitored value is set to said value smaller than the minimum value.

2. An optical repeater OFF-state supervisory device comprising:
    a photoelectric conversion means for converting an input optical signal into an electrical signal;
    an equalizing amplifier means for waveform-shaping said electrical signal output from said photoelectric conversion means;
    a monitoring circuit means, associated with said equalizing amplifier means, for detecting a monitored value when converted into an electrical signal;
    a clock extraction means for extracting a timing clock for regenerating signals from an output of said equalizing amplifier means;
    a discrimination circuit means for regenerating the output of said equalizing amplifier means into a desired pulse waveform by means of a timing clock from said clock extraction means;
    an electro-photoconversion means for converting an electrical pulse signal into an optical pulse signal;
    a monitoring circuit means further includes:
        a monitored value output processing unit for receiving a monitored value from said monitoring circuit means and carrying out phase modulation after an A/D conversion of said monitored value, and for outputting said modulated signal into said discrimination circuit means, and
        an input OFF-state detection means, operably connected to said monitored value output processing unit, for detecting an input OFF-state from a signal of said discrimination circuit means to send the output to a change-over circuit; and
    a change-over circuit means, operably connected to said input OFF-state detection means, for receiving a signal of the result of detection from the input OFF-state detection means,
    wherein, while it is not detected that an input optical signal has been in an OFF state, said change-over circuit means is in a HIGH level state and when it is detected at said input OFF-state detection means that the input optical signal has been in an OFF state, the change-over circuit means is switched over to a LOW level state so as to detect that a fault has occurred in an optical transmission line connected to an optical repeater when said input optical signal is in said input OFF-state and when said change-over circuit means has been switched over to a LOW level state.

3. An optical repeater OFF-state supervisory device according to claim 2, wherein, while the input OFF-state detection means does not detect that an input optical signal has been in an OFF state, a monitored value from the monitoring circuit means is output at the input OFF-state detection means, and when the input OFF-state detection mean detects that the input optical signal has been in an OFF state, a change-over is carried out such that a fixed monitored value may be outputted to said discrimination circuit means, where the fixed monitored value is determined to be a value smaller than the minimum value of the monitored value when the input optical signal is not in an OFF state.

* * * * *